US006785073B2

(12) United States Patent
Min et al.

(10) Patent No.: US 6,785,073 B2
(45) Date of Patent: Aug. 31, 2004

(54) IDENTIFICATION AND CANCELLATION OF CAGE FREQUENCY IN A HARD DISC DRIVE

(75) Inventors: ShuangQuan Min, Singapore (SG); KianKeon Ooi, Singapore (SG); YangQuan Chen, Singapore (SG); Ricky Wei Watt Yeo, Singapore (SG); WeiSung Lee, Singapore (SG); BengWee Quak, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 296 days.

(21) Appl. No.: 09/844,192

(22) Filed: Apr. 27, 2001

(65) Prior Publication Data

US 2003/0218814 A1 Nov. 27, 2003

Related U.S. Application Data

(60) Provisional application No. 60/211,550, filed on Jun. 14, 2000, and provisional application No. 60/227,880, filed on Aug. 25, 2000.

(51) Int. Cl.$^7$ .......................... G11B 27/36; G11B 5/596
(52) U.S. Cl. .................... 360/31; 360/77.04; 360/77.08
(58) Field of Search .......................... 360/31, 75, 77.04

(56) References Cited

U.S. PATENT DOCUMENTS

| 4,531,137 | A | 7/1985 | Drews et al. ................. 360/77 |
| 5,162,955 | A | 11/1992 | Burdenko ................ 360/77.02 |
| 5,333,140 | A | 7/1994 | Moraru et al. ............. 371/21.2 |
| 5,339,204 | A | 8/1994 | James et al. .................. 360/51 |
| 5,774,295 | A | 6/1998 | Tsai ........................ 360/77.03 |
| 5,825,578 | A | 10/1998 | Shrinkle et al. |
| 5,903,408 | A | 5/1999 | Omi |
| 6,476,995 | B1 * | 11/2002 | Liu et al. ...................... 360/75 |
| 2002/0030920 | A1 * | 3/2002 | Min et al. ................ 360/77.04 |

FOREIGN PATENT DOCUMENTS

JP 2000076806 A 9/1998

* cited by examiner

Primary Examiner—David Hudspeth
Assistant Examiner—Glenda P Rodriguez
(74) Attorney, Agent, or Firm—Westman, Champlin & Kelly (57) ABSTRACT

Written-in runout due to vibration of the cage of a spindle motor of a disc drive is detected by identifying an initial cage frequency value of the motor. A written-in magnitude of successive servo burst closures, $D(n_c)$, is read over a plurality of tracks, and a maximum servo burst closure $D(n_{cp})$ is identified from the plurality of read servo bursts. A magnitude of the cage frequency at a servo sector $n_0$ is calculated based on a difference between the read magnitudes of the servo burst closures at servo sectors $n_c$ and $n_{c+1}$, and a phase of the cage frequency is calculated based on the magnitude of the written-in cage frequency at servo sector $n_0$. The profile, in the form of cage frequency, maximum servo burst closure magnitude, and initial phase, is stored in a memory or table for each of a plurality of radial zones of tracks. The profile is combined with a position error signal and applied to the controller in a feed forward scheme to adjust the position of the head based on the written-in runout.

22 Claims, 9 Drawing Sheets

Identifying frequency variation in Cage Sectors

FIG. 12 phase shift(bursts)

IDENTIFICATION AND CANCELLATION OF CAGE FREQUENCY IN A HARD DISC DRIVE

CROSS-REFERENCE TO RELATED APPLICATION

This application claims benefit of U.S. Provisional Application No. 60/211,550, filed Jun. 14, 2000 for "Feed Forward Compensation for Cage Frequency Using a Reference Head in a Servowriter" and U.S. Provisional Application No. 60/227,880, filed Aug. 25, 2000 for "Identification and Cancellation of Cage Frequency in a Hard Disc Drive".

FIELD OF THE INVENTION

This invention relates to detection and cancellation of non-repeatable run-out due to spindle motor cage vibration during a servowrite operation in a disc drive.

BACKGROUND OF THE INVENTION

Spindle motor vibration is a type of non-repeatable runout (NRRO) that causes motion between the head and media during the rotation of the media by the spindle motor. The NRRO is written into the servo pattern during servowrite operations. Spindle NRRO is composed of low-frequency vibration generated by the ball bearings of the motor, the largest single component being the cage vibration generated by the motor cage. Cage vibration is an extremely low frequency vibration that causes DC track spacing errors and track closure errors during servo writing.

Servowrite operations are performed during manufacture of the disc drive to record servo data onto one or more disc surfaces of the disc drive. The servo writer is affixed to the disc drive and includes a read/write clock head positioned by an actuator arm over the disc to write clock patterns to the disc and to control the data head of the disc drive to write servo data patterns to the disc. In disc drives employing embedded servo patterns, the servo data patterns are written into servo sectors between user fields on each track.

Servo patterns are written on the disc by first writing a clock pattern onto the entire track, or group of tracks, on the disc, including those portions that will become user fields. The clock pattern is usually written over more than one convolution of the disc, over-writing the clock pattern recorded during the prior convolution, to assure that the clock pattern is recorded over the entire track. The end point, where the two recorded convolutions meet, is called the splice point. Next, the track is separated into servo sectors and user data fields, and the disc drive data head writes the servo pattern over the recorded clock patterns in the servo sectors while the clock head reads the clock pattern.

Radial motion of the disc beneath the data head due to spindle motor cage vibration causes the servo writer to write the servo pattern in a spiral, rather than a circle, resulting in a radial discontinuity of the servo pattern at the splice point. As a result, the servo sectors are recorded as segments of that spiral, and not truly on the circular path of the track.

A high magnitude of spindle motor cage vibration during servowriter operations may cause a serious track closure or track squeeze errors, known as track misregistrations. If track misregistrations are severe, the affected tracks are deemed defective during certification of the disc drive, and are tagged for skipping during read and write operations. Consequently, track misregistration diminishes the capacity of the disc media.

Track closure error is evidenced by a position error signal splice during servo pattern write operations that cause servo off-track failures during drive operations. The track squeeze is evidenced by adjacent tracks positioned closer than expected at various locations on the media. This track misregistration is a type of write-to-write track misregistration that generates data cross-talk between adjacent tracks and/or distorts the servo pattern causing defect servo pattern errors.

Experiments on motor cage vibration show that cage vibration is non-synchronous to spindle rotation, but is periodic. The periodic waveform of cage vibration repeats itself over intervals longer than one spindle rotation. Hence, a phase relationship exists between the waveform and spindle rotation. Moreover, the frequency and magnitude of cage vibration is about the same for all motors of same type, regardless of the disc drive system in which they are employed. Hence, the error written in the tracks due to cage vibration has a similar magnitude whether there are track closure errors or not. However, track closure and track squeeze appear to occur randomly due to complicated phase relationships of the cage frequency, spindle rotation and starting phase of the servo write.

U.S. Application Ser. No. 09/483,525 filed Jan. 14, 2000 for "Method and Apparatus for Reducing Track Misregistration from Servo Track Writing" by Xiang Liu, Joseph Liu, Kevin Gomez and Choonkiat Lim and assigned to the same assignee as the present invention, describes placement of a sensor, such as a capacitive or laser interferometer, to measure and extract information concerning cage frequency. Written-in non-repeatable runout due to cage frequency is reduced by starting servo track write operations at selected phases of the cage frequency. However, this technique imposes additional requirements of placement and calibration of the extra sensor. To overcome the problems associated with the extra sensor, it has been proposed to detect the cage frequency with a reference head, or with the clock head of the servowriter, or with the data head of the disc drive. Some of these additional techniques are described in U.S. Application Ser. No. 09/798,801, filed Mar. 2, 2001 for "Detection and Cancellation of Cage Frequency using the Clock Head in a Servowriter" by ShuangQuan Min, Ricky Yeo, KianKeong Ooi, Xiong Liu, BengWee Quak and Chi-apHeok Ang, assigned to the same assignee as the present invention. These techniques removed significant track closure and track squeeze error during servo write. However, each of these techniques requires modification to the hardware and software of the servowriter to add the function of compensation of cage frequency. The present invention provides a solution to these and other problems associated with cage vibration, and offers other advantages over the prior techniques.

SUMMARY OF THE INVENTION

The present invention is directed to a technique by which written-in cage frequency error can be identified and cancelled at the drive certification level.

In one embodiment, written-in runout due to vibration of the cage of a spindle motor of a disc drive is identified. An initial cage frequency of the motor is identified, and the magnitude of written-in successive servo burst closures is read over a plurality of tracks. A maximum servo burst closure is identified from the plurality of read servo bursts, and a magnitude of the cage frequency at a servo sector $n_0$ is calculated based on a difference between the read magnitudes of successive servo burst closures. The phase of the cage frequency is calculated based on the magnitude of the written-in cage frequency at servo sector $n_0$. Preferably, the parameters of the cage frequency profile are stored as values of the cage frequency, maximum servo burst closure and calculated phase. In preferred embodiments, the tracks are segregated into a plurality of zones, and the cage frequency profile is identified for each zone, thereby minimizing the effect of phase drift.

In another embodiment, a track following signal in a rotatable disc drive is compensated for written-in cage frequency runout. A position signal is supplied to an actuator of the disc drive, and the position signal is modified based on the cage frequency profile. In preferred embodiments, the cage frequency profile is read from a memory associated with a controller of the disc drive. The cage frequency profile is added to a signal representing a position disturbance of a read head of the disc drive, and combined with a position command signal for application to the drive controller to operate the actuator.

Yet another embodiment comprises apparatus for compensating a radial position of a head of a disc drive for written-in cage frequency runout. The apparatus includes a controller that provides a position signal to the actuator to control position of the head relative to a selected track on the medium of a disc drive. Cage frequency profile means modifies the position signal based on a cage frequency profile of the disc drive.

In some embodiments of the apparatus, a memory contains a cage frequency profile associated with the disc drive. A summing device, which may be a feed forward controller, combines the cage frequency profile with a signal representing a position disturbance of the head and a position command signal. The drive controller is responsive to the summing device to operate the actuator to control the position of the head relative to the selected track.

These and other features and benefits that characterize the present invention will be apparent upon reading the following detailed description and review of the associated drawings.

DETAILED DESCRIPTION OF ILLUSTRATIVE EMBODIMENTS

Figure 1:
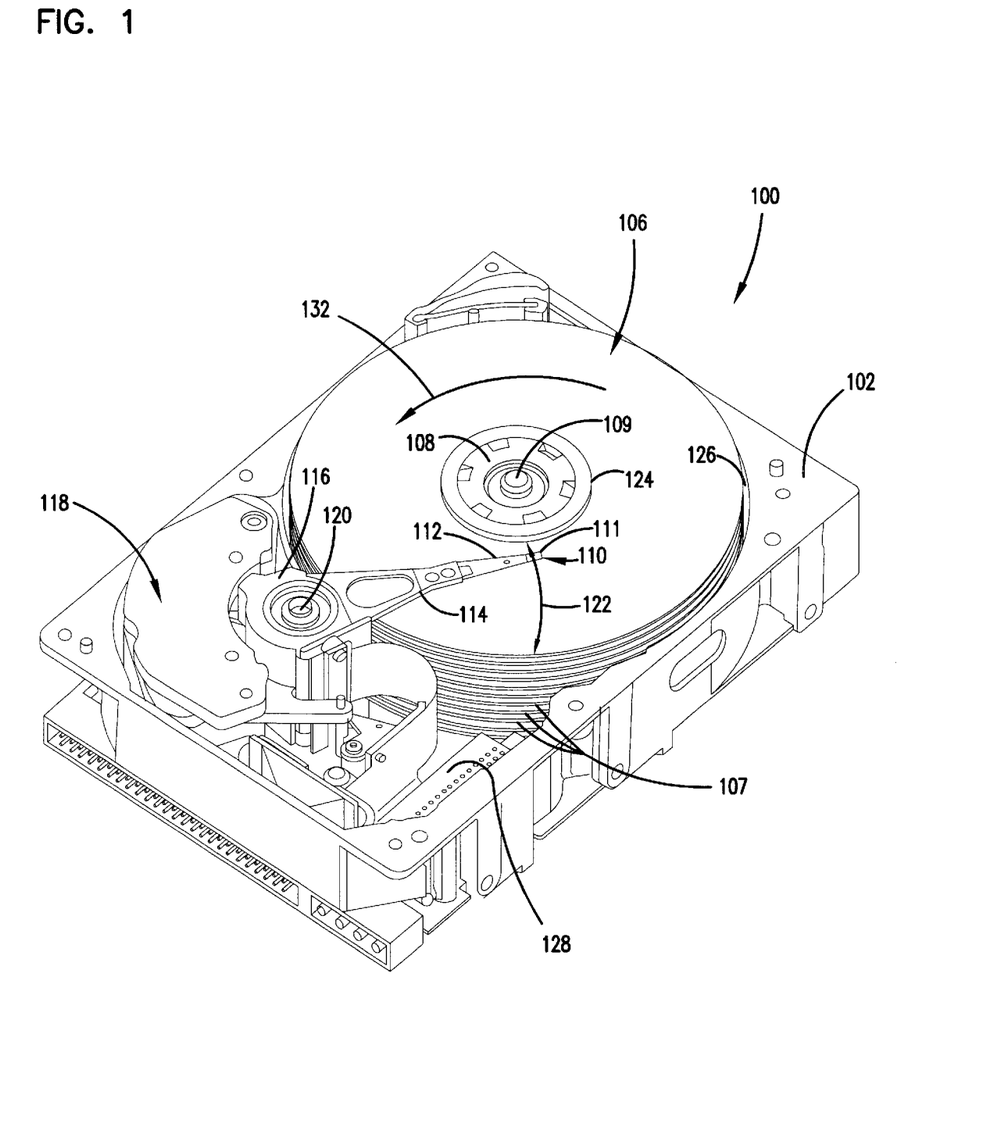
FIG. 1 is a perspective view of a disc drive in which aspects of the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown), by a disc clamp 108. Disc pack 106 includes a plurality of individual discs 107, which are mounted for co-rotation about central axis 109. Each disc surface has an associated disc head-slider 110 that is mounted to disc drive 100 for communication with the confronting disc surface. Head-slider 110 includes a slider structure arranged to fly above the associated disc surface of an individual disc of disc pack 106, and a transducing data head 111 arranged to write data to, and read data from, concentric tracks 113 on the confronting disc surface. In the example shown in FIG. 1, head-sliders 110 are supported by suspensions 112 which are in turn attached to track actuator arms 114 of an actuator 116. Actuator 1 16 is driven by a voice coil motor (VCM) 118 to rotate actuator arms 114, and their attached data heads 111, about a pivot shaft 120. Rotation of actuator arms 114 moves the heads along an arcuate path 122 to position the heads over a desired data track between a disc inner diameter 124 and a disc outer diameter 126. Voice coil motor 118 is operated by servo electronics included on circuit board 130 based on signals generated by the heads 111 of head-sliders 110 and a host computer (not shown). Read and write electronics are also included on circuit board 130 to supply signals to the host computer based on data read from disc pack 106 by the read heads of head-sliders 1 10, and to supply write signals to the write head of head-sliders 1 10 to write data to the discs.

Figure 2:
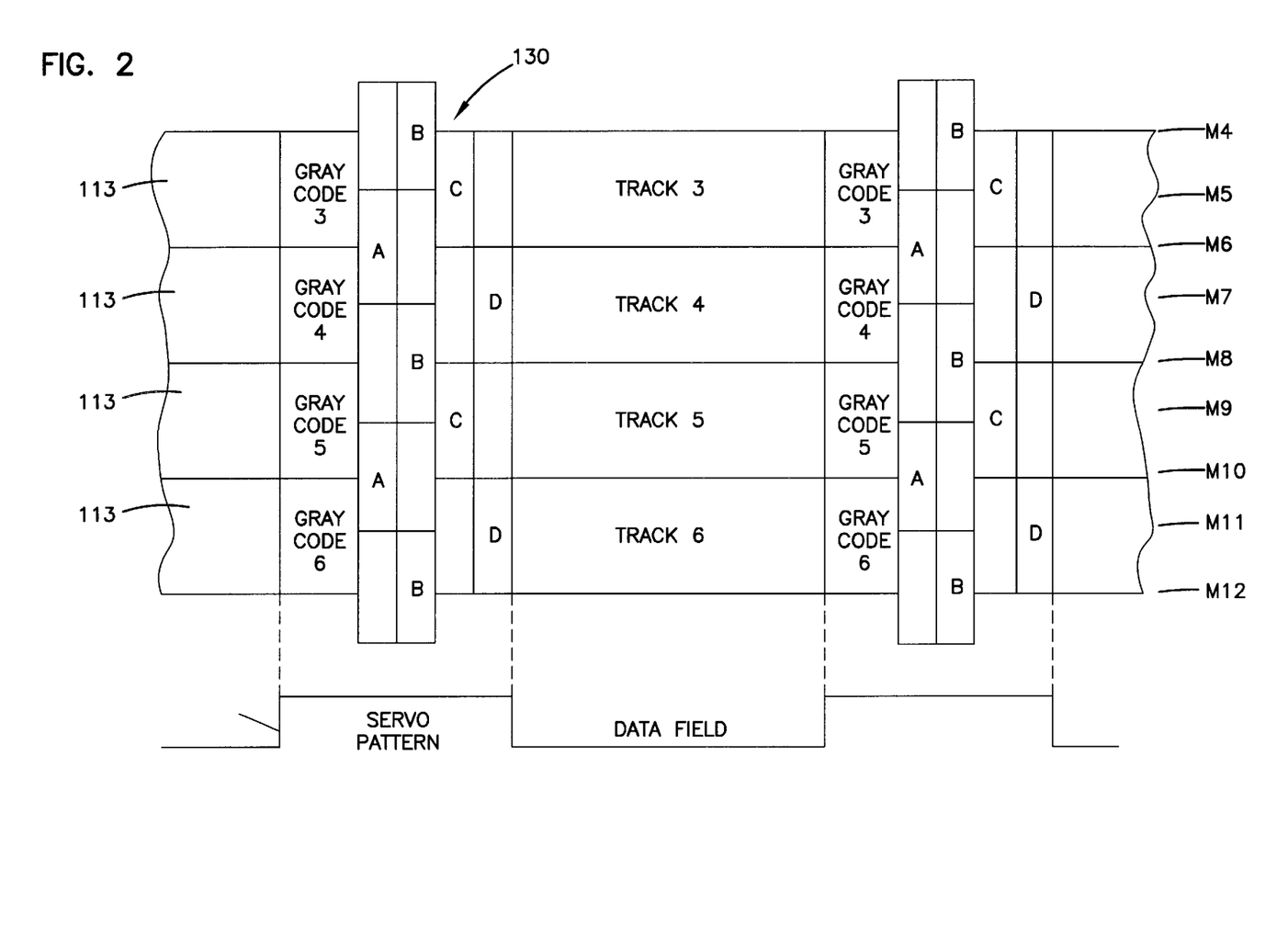
FIG. 2 illustrates the arrangement of servo patterns and data fields along several adjacent tracks of the disc drive illustrated in FIG. 1.

A read operation by disc drive 100 is accomplished by positioning head 111 directly over the center of a selected concentric track 113. Track positioning is maintained by reading servo data 150 from the track to operate the controller of the disc drive. The controller operates VCM 118 to control the position of the head over the center of the track. As shown particularly in FIG. 2, servo pattern 150 includes a gray code and servo burst positioning signals A, B, C and D. The gray code, for example, may include address and track marks, automatic gain control codes, clock recovery patterns, etc. The gray code and A, B, C and D servo burst patterns, as well as their use for track positioning, are well known in the art. Typically, the A, B, C and D servo burst codes are positioned at track center and half-track positions. Thus, gray codes C and D are illustrated as centered on alternate tracks and servo burst patterns A and B are centered on alternate half tracks. The servo codes illustrated in FIG. 2 are written during a servo write operation.

During the servo write operation, spindle motor vibration, known as non-repeatable run-out (NRRO), causes motion between the media and the head. Spindle NRRO is composed of low-frequency components generated by the ball bearings. One of the components of spindle NRRO is the cage frequency due to vibration of the cage containing the ball bearings. Cage frequency is a cyclic low frequency vibration. Because cage frequency is not synchronous to spindle rotation, it is non-repeatable run-out. Radial motion of the disc due to cage vibration causes the servo writer to write the servo pattern in a spiral, rather than a circle, resulting in a radial discontinuity of the servo pattern at the splice point where two recorded convolutions of the servo pattern meet. As a result, the servo patterns are recorded as segments of a spiral, and not truly on concentric paths. The lack of concentricity of the servo pattern causes the head to track in a non-circular path causing track closure errors and track squeeze errors. Track closure error is a type of write-to-read track misregistration. Track squeeze error is a type of write-to-write track misregistration that is evidenced by adjacent tracks being positioned closer than expected at various locations on the media. Track closure errors cause off-track failures during drive operations, whereas track squeeze errors cause cross talk and defective servo pattern.

Repeatable runout zero acceleration path (RRO-ZAP) operations are performed during certification tests of disc drives to devise a strategy to reduce track closure caused by repeatable run-out during disc drive operations. The zero acceleration path (ZAP) concept is a non-adaptive feed forward technique used to compensate written-in RRO for the feedback controller of a disc drive. One such ZAP technique is described in U.S. Application Ser. No. 09/489,532, filed Jan. 21, 2000 for "Repeatable Runout Compensation Using a Learning Algorithm With Scheduled Parameters", by YangQuan Chen, LeeLing Tan, KianKeong Ooi, Qiang Bi and KokHiang Cheong, and assigned to the same assignee as the present invention. The ZAP technique employs a ZAP table that stores the learned RRO and provides compensation signals to the drive actuator based on expected repeatable runout. However, the ZAP technique can not cancel track closure effectively in practice.

The present invention provides a technique for identification and minimization of NRRO due to written-in cage frequency. There are two distinct operations employed in the present invention. First, the cage frequency profile is identified and stored in the ZAP table, or a dedicated look-up table for use with the drive controller. This operation is performed during the certification test stage for the disc drive. The second operation is performed during operation of the disc drive, by which the controller retrieves the identified cage frequency profile from the ZAP table or look-up table and cancels the cage frequency profile in the position error signal by feed forward compensation.

A. Identification of Cage Frequency Profile

Figure 3:
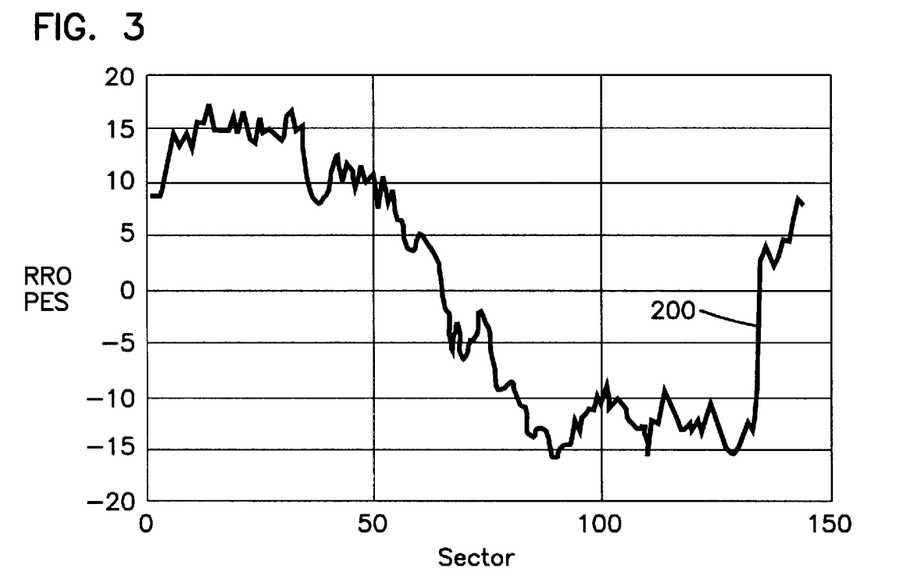
FIGS. 3–13 are graphs illustrating various aspects of the technique for detecting written-in cage frequency error in a disc drive.
Figure 4:
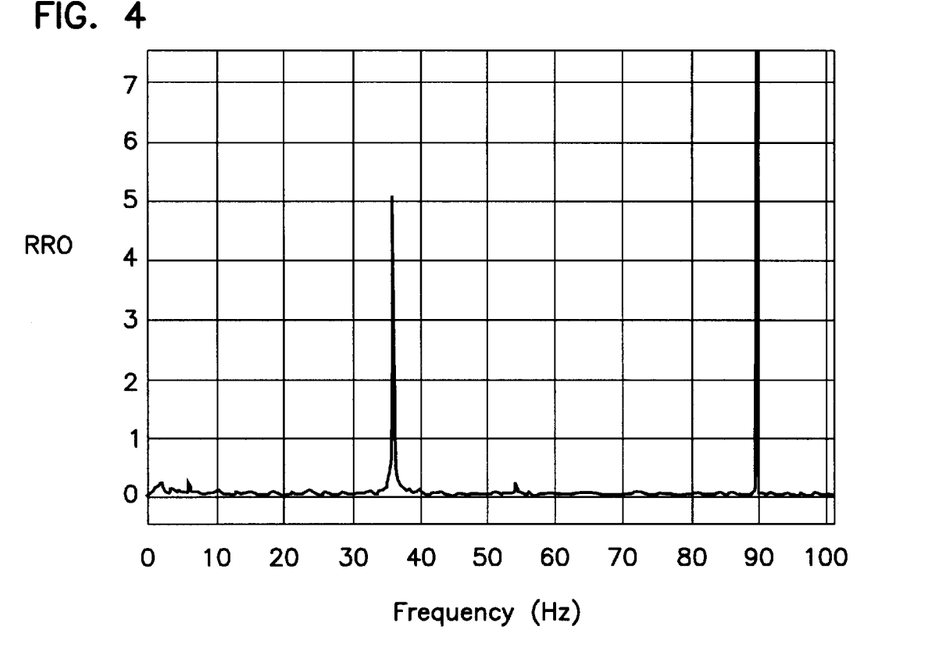

Experimental data reveals that the cage frequency has a constant frequency with little variation between motors of the same model. The cage frequency error written into tracks has a similar magnitude whether there are track closure errors on the track or not. FIG. 3 illustrates an open loop position error signal of a servo writer for a single track that has been averaged over 256 revolutions of a disc containing 144 servo patterns (bursts). The position error signals are measured in "counts", and range between −127 and +127 counts representing the fall width of a track, with 0 indicating track center. As illustrated in FIG. 3, the position error signal averaged between about ±17 counts. However, the position error signal shows a closure 200 of about 10% of track width between sectors 134 and 135 which acts as a disturbance during drive operation and follows an off-track spike. FIG. 4 illustrates the frequency spectrum of the open loop position error signal (including RRO and NRRO) and identifies the 90 Hertz spindle motor harmonic, which is a form of repeatable runout, while the cage frequency of 35.822 Hertz non-repeatable runout to which the present invention is directed. Further experiments reveals that the magnitude variation of the cage frequency signal is between 6% and 8%, with mean variation of 6.65%.

The cage frequency profile is identified from the track closure magnitudes of a plurality of consecutive tracks and their associated half tracks. More particularly, cage frequency is identified from the repeating pattern of the error signal magnitude over a low frequency extending beyond the number of servo sectors $N_k$ in a single revolution of the disc. The number of servo sectors, $N_c$, in a single cycle of the cage vibration frequency is calculated as $$N_c = \frac{N_k \cdot f_m}{f_c},$$

where $f_m$ is the spindle motor frequency and $f_c$ is the cage frequency. Hence, for a disc drive having 144 servo sectors per revolution ($N_k$), a spindle motor frequency $f_m$ of 90 Hz, and a cage frequency $f_c$ of 36 Hz, the number of servo sectors per cycle of cage vibration frequency, $N_c$, is 360.

Figure 5:
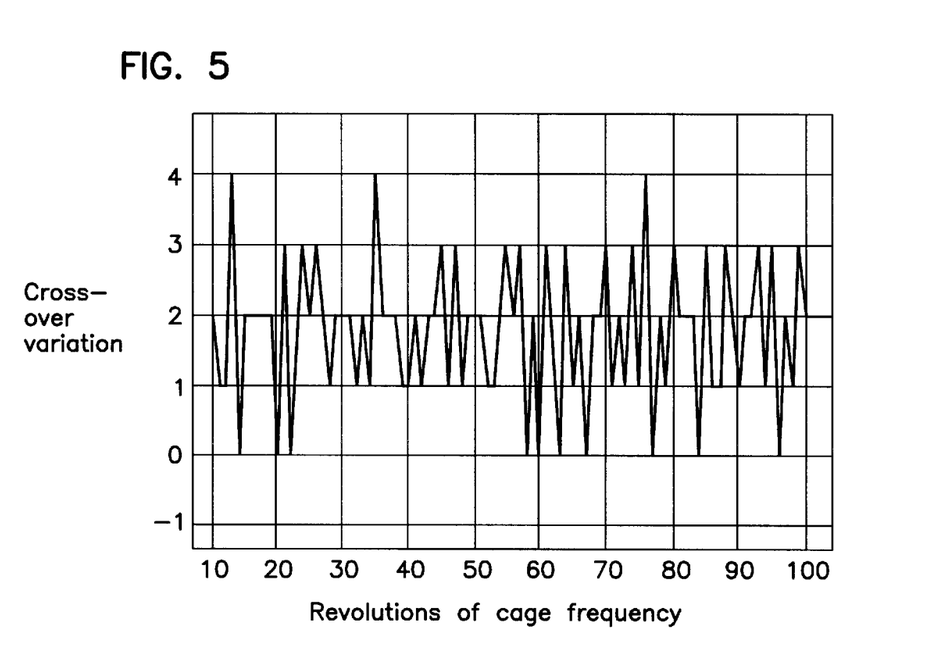

The cage frequency is approximately sinusoidal such that each cycle of cage frequency includes two crossover points, one where the signal magnitude goes negative and one where the signal magnitude goes positive. If the cage frequency is 36 Hz, the number of servo sectors is 360 per cycle. However, the signal-to-noise ratio in the cage frequency may cause variation of the number of servo sectors between two successive crossovers (i.e., over a cage frequency cycle). For example, if the number of servo sectors in a given cycle of cage frequency is 362, the crossover variation for the cycle from 360 is 2. FIG. 5 illustrates the magnitude of crossover variations over 102 cycles of cage frequency, and demonstrates that the crossover variations are between 0 and 4 servo sectors.

As shown in FIG. 2, servo bursts A, B, C and D are written in a offset fashion such that servo bursts C and D are coincident with successive tracks 113 and servo bursts A and B are offset by one half track. The servo writer operates data head 111 to write servo patterns A, B, C and D in a sequence such that servo burst B is written when head 111 is at position M4, servo burst C is written at position M5, servo burst A is written at position M6, servo pattern D is written at position M7, and continuing radially across the disc. Erasures and overwriting occurs during the servo write to form the servo bursts shown. Thus, the servo pattern for a single track requires writing two servo bursts, although three servo bursts are employed for track following purposes, as is well known in the art. Consequently, the number of servo bursts is twice the number of tracks on the recording surface. The track closure error is caused by written-in burst closure error.

The written-in servo burst closure (between sectors $n_c$ and $n_c-1+N_k$) is the difference between the magnitude of the cage frequency at servo sector $n_c$ and the magnitude of the cage frequency at servo sector $n_c-1+N_k$. Consequently, the magnitude of the written-in burst closure, $D(n_c)$ is $$D(n_c)=P_c(n_c)-P_c(n_c-1+N_k)\approx P_c(n_c)-P_c(n_c)-P_c(n_c+N_k),$$

where $P_c(n_c)$ is the magnitude of the cage frequency at servo sector $n_c$ which is represented by $$P_c(n_c)=P_c\cdot\sin(2\pi f_c T_s \cdot n_c),$$

where $$T_s = \frac{1}{N_k f_m}$$

is the sampling duration of the servo sector and $P_c$ is the peak magnitude of the cage frequency. Because there are $N_k$ servo sectors per disc revolution, $P_c(n_c-1+N_k)$ is the magnitude of the cage frequency signal at servo sector $n_c-1+N_k$. If the servo writer starts writing the servo track at servo sector $n_c$ of cage frequency, the magnitude of the written-in burst closure is $$D(n_c) = R_c \cdot P_c \cdot \sin\left(2\pi f_c T_s \cdot \left(n_c - \frac{1}{2}\left(\frac{1}{2}N_c - N_k\right)\right)\right), \quad \text{Eq. 1}$$

where $$R_c = \frac{\sin(2\pi f_c T_s \cdot N_k)}{\sin\left(\pi f_c T_s \cdot \left(\frac{1}{2}N_c - N_k\right)\right)}$$

and is the ratio of the servo burst closure maximum magnitude to the cage frequency peak magnitude.

If servo sector $n_{cp}$ is the sector where the maximum burst closure occurs, $D(n_c)$ reaches its maximum magnitude of $$D(n_{cp}) = R_c \cdot P_c \cdot \sin\left(2\pi f_c T_s \cdot \left(n_{cp} - \frac{1}{2}\left(\frac{1}{2}N_c - N_k\right)\right)\right), \quad \text{Eq. 2}$$

when either $$\left(n_{cp} - \frac{1}{2}\left(\frac{1}{2}N_c - N_k\right)\right) = \frac{N_c}{4}, \text{ or} \quad \text{Eq. 3a}$$

$$\left(n_{cp} - \frac{1}{2}\left(\frac{1}{2}N_c - N_k\right)\right) = \frac{3}{4}N_c. \quad \text{Eq. 3b}$$

Figure 6:
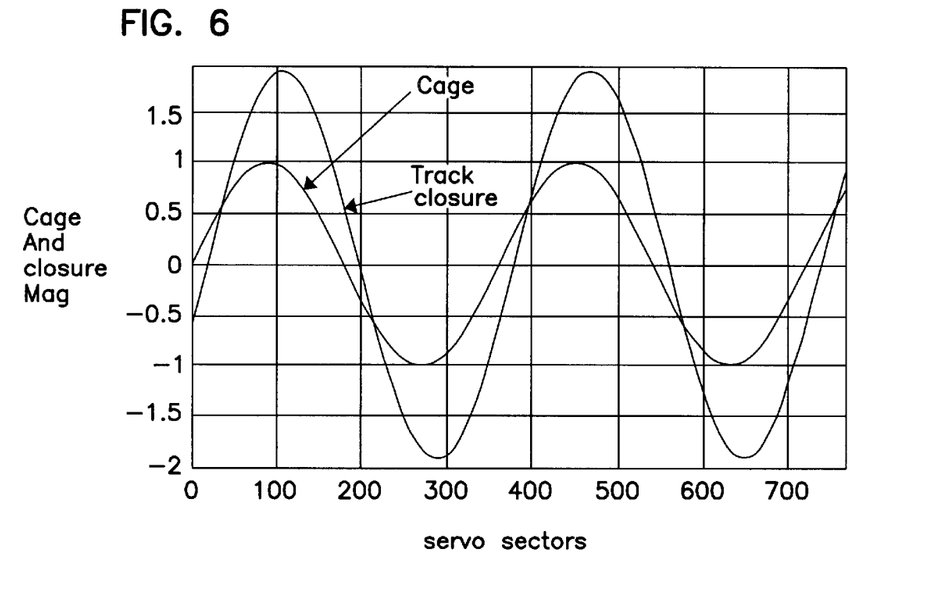

If the servowrite operation starts at servo sector $n_{cp}$, $D(n_{cp}) = \pm R_c \cdot P_c$. If $f_m = 90$ Hz, $N_k = 144$ sectors, $f_c = 36$ Hz and $N_c = 360$ sectors, it can be shown that $R_c = 1.9021$. Consequently, $D(n_{cp}) = \pm 1.9021 \cdot P_c$ and $n_{cp} = 108$ and 288, meaning maximum burst closure occurs at sectors 108 and 288 of the cage frequency cycle. FIG. 6 illustrates the relationship between cage frequency $P_c(n_c)$ and the written-in burst closure $D_j(n_c)$. Moreover FIG. 6 shows that the maximum burst closure occurs periodically in relation to the cage frequency and, for the present example, is 1.9021 times the peak cage frequency magnitude.

Figure 7:
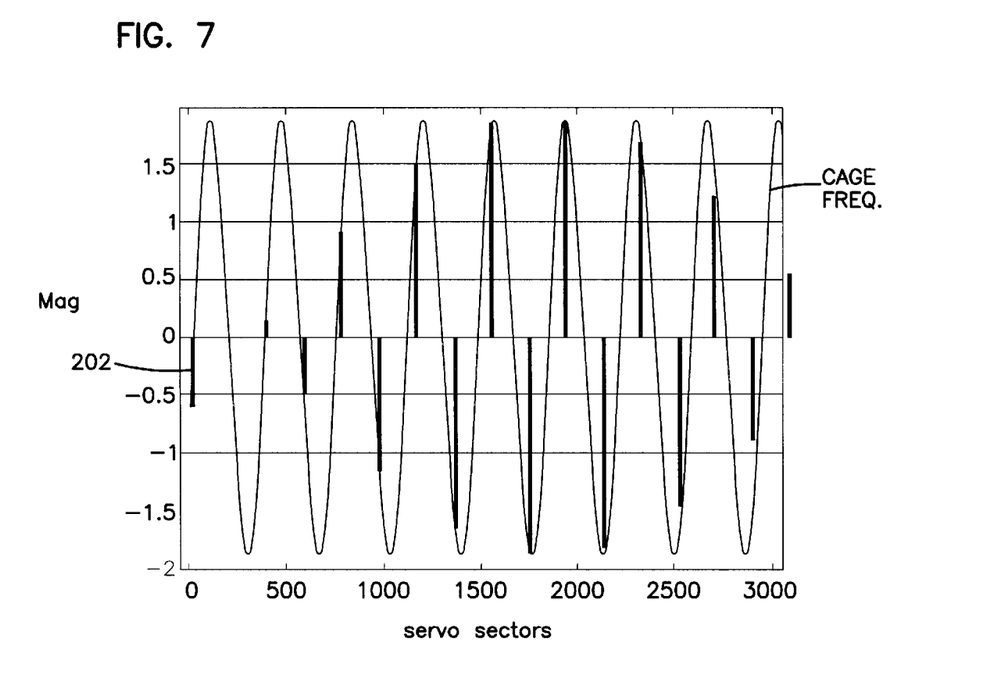

FIG. 7 illustrates the distribution and magnitude of the burst closures 202 in the consecutive bursts. If the burst write time in terms of sectors is $N_W = N_k + N_s$, where Ns is the time, in terms of servo sectors, for data head 111 (FIG. 1) to settle from the position of the written burst to the next burst during servo writing. The consecutive burst closure sequence is $$D(N_W \cdot k + n_0) = R_c \cdot P_c \cdot \sin\left(2\pi f_c T_s \cdot \left(N_W \cdot k + n_0 - \frac{1}{2}\left(\frac{1}{2}N_c - N_k\right)\right)\right),$$

where $k \in [0, K-1]$ is an arbitrary servowriting burst of the K consecutive servowriting bursts and $n_0$ is the phase of the cage frequency when the servowriter starts writing the first burst of the K consecutive bursts.

If the number of consecutive servo writing bursts K is large enough, it will be appreciated that most magnitudes or possible burst closures described in Equation 1 will be experienced. Consequently, the burst closure having the greatest magnitude among the consecutive bursts is or approaches the maximum burst closure. The initial cage frequency magnitude, $P_c$, can be calculated from Equation 2. The initial starting phase can be calculated using either Equation 3a or 3b, depending upon the direction of the maximum burst closure.

Figure 8:
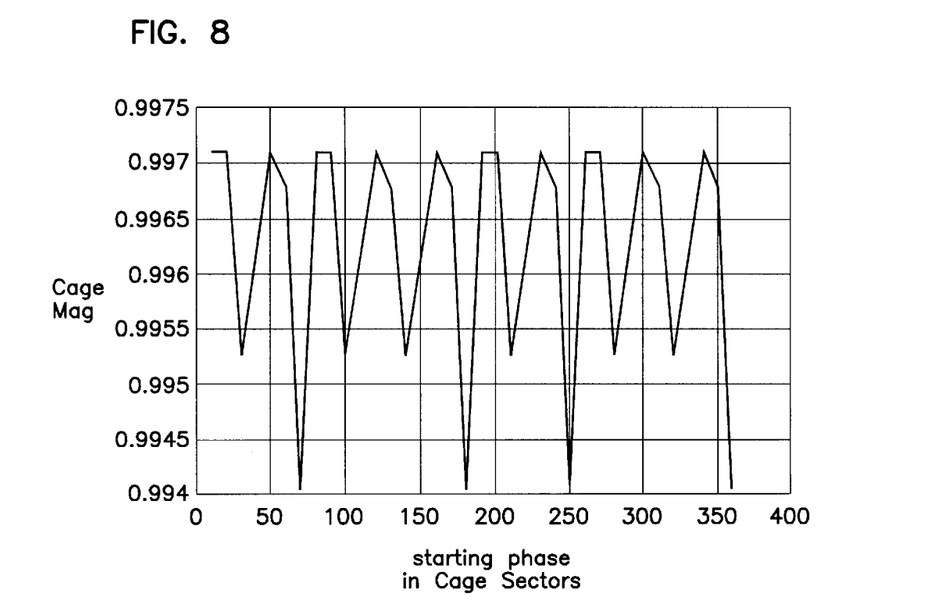
Figure 9:
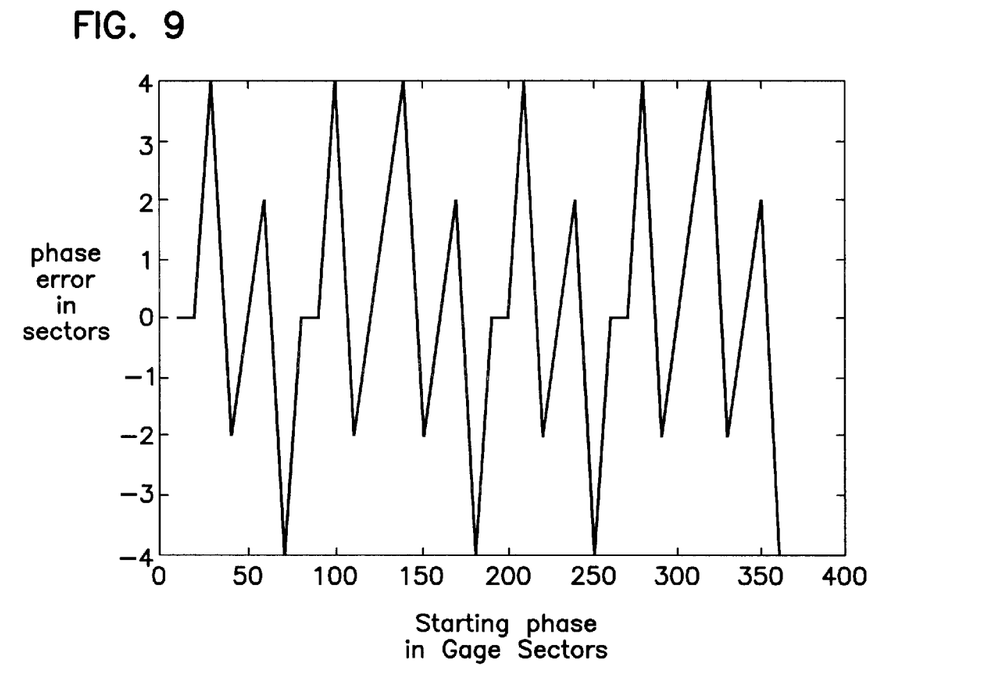

FIG. 8 illustrates the ratio of the initial identified cage frequency magnitude to the actual cage frequency magnitude starting with phase $n_0$, varying from 0 to $N_c$ sectors, where $N_c$ equals 363 sectors, and K equals 20. The error of the initial identified magnitude and actual magnitude is less than 1% if noise is negligible. The error is not sensitive to the starting phase $n_0$. Similarly, FIG. 9 shows the error of the initial identified cage frequency phase and actual cage frequency phase starting with phase $n_0$ varying from 0 to $N_c$. As shown in FIG. 9, the error is less than four sectors if noise is negligible. The error is not sensitive to the starting phase $n_0$.

Since non-repeatable runout (NRRO) is present during drive operation, the error of the initial identification may be larger than herein stated. Nevertheless, the frequency of the actual cage frequency varies slightly from one drive to another. Therefore, the fine identification of the magnitude, phase and frequency is necessary. This can be accomplished by identifying a cost function as the summation of the absolute difference between the actual burst closures and the estimated burst closures as a linear cost function.

$$S(N_{c0}, n_0, P_{c0}) = \sum_{k=1}^{K} |D(k) - D_i(k, N_{c0}, n_0, P_{c0})|,$$

where $S(N_{c0}, n_0, P_{c0})$ is a function of the cycle of the identified cage frequency in terms of sectors $N_{c0}$ and the identifying magnitude $P_{c0}$ of the cage frequency at sector $n_0$ Comparatively, the cost function may be a square cost function that is the sum of the square difference of the actual burst closures and corresponding burst closures generated by the identifying cage frequency:

$$S(N_{c0}, n_0, P_{c0}) = \sum_{k=1}^{K} (D(k) - D_i(k, N_{c0}, n_0, P_{c0}))^2.$$

Figure 10:
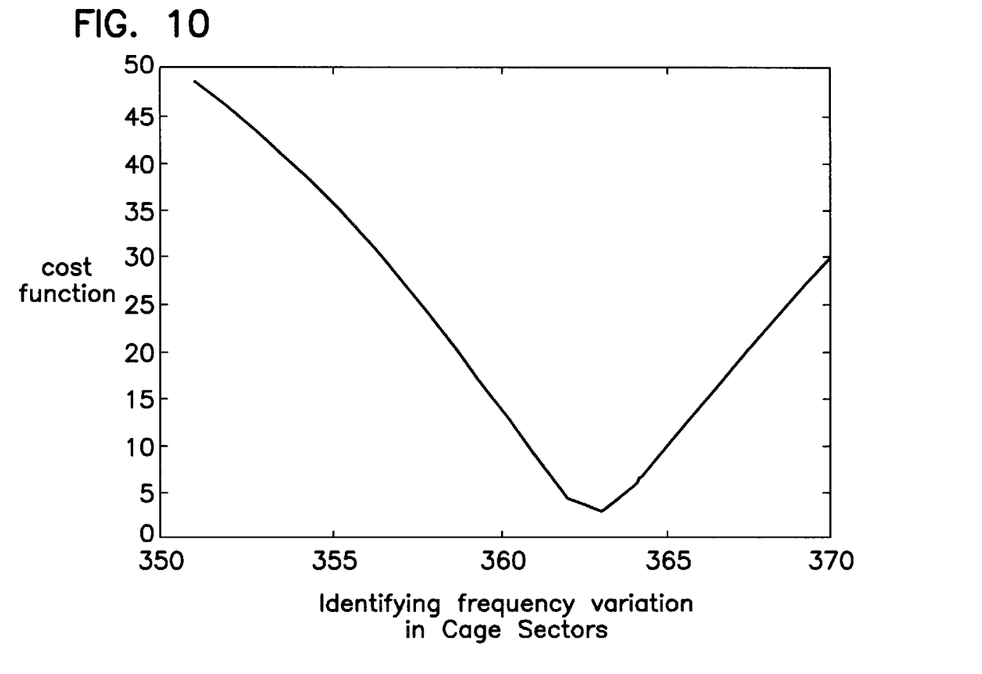
Figure 11:
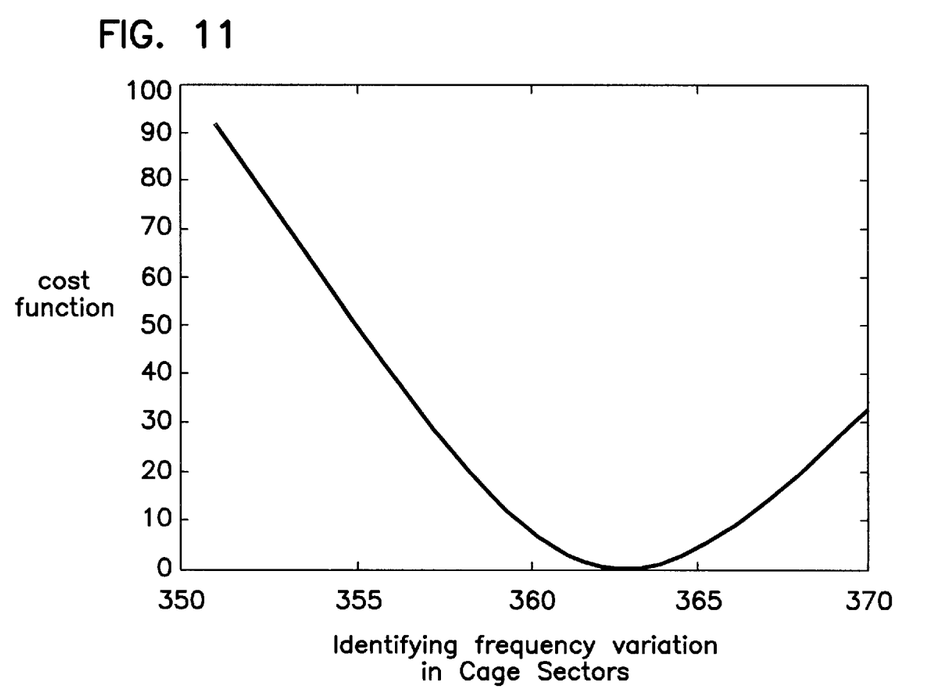

FIG. 10 illustrates the linear cost function variation versus the identified cage frequency. The phase $N_i$ and magnitude $P_{ci}$ are fixed at the initial identified phase and initial identified magnitude. As shown in FIG. 10, when the identified frequency approaches the actual frequency, at 363 sectors per cycle, the cost function approaches its minimum linearity. FIG. 11 illustrates the square cost function variation with identifying frequency in a manner similar to FIG. 10. Comparing FIGS. 10 and 11, the minimum of the square cost function in FIG. 11 is less than that of the linear cost function in FIG. 10. Therefore, identification with a square cost function has a higher identification resolution with noise in the actual burst closure measurement.

Figure 12:
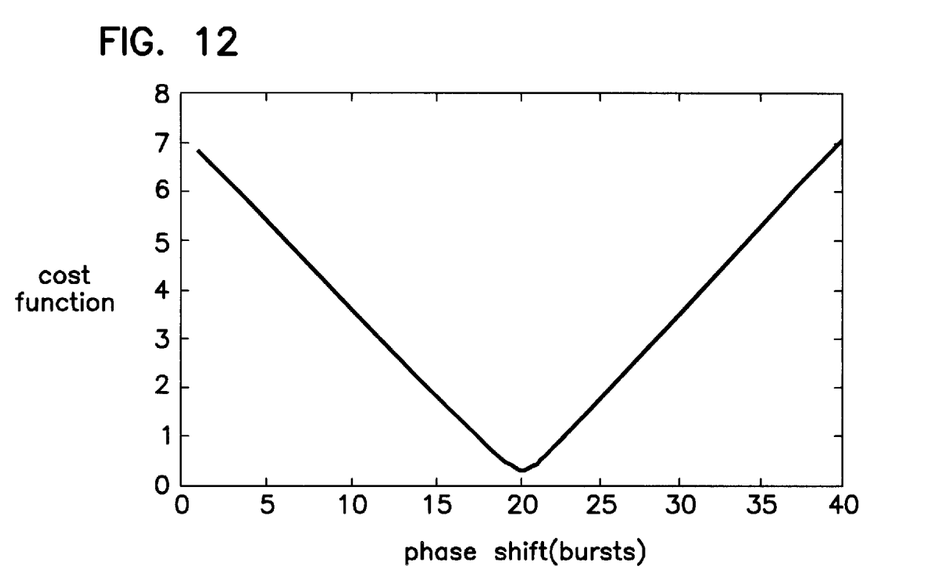

FIG. 12 illustrates the linear cost function variation with identified phase. In this case, the cage frequency cycle has an initial crossover at burst 20 so when the identifying phase approaches the actual case, the cost function approaches its minimum.

Figure 13:
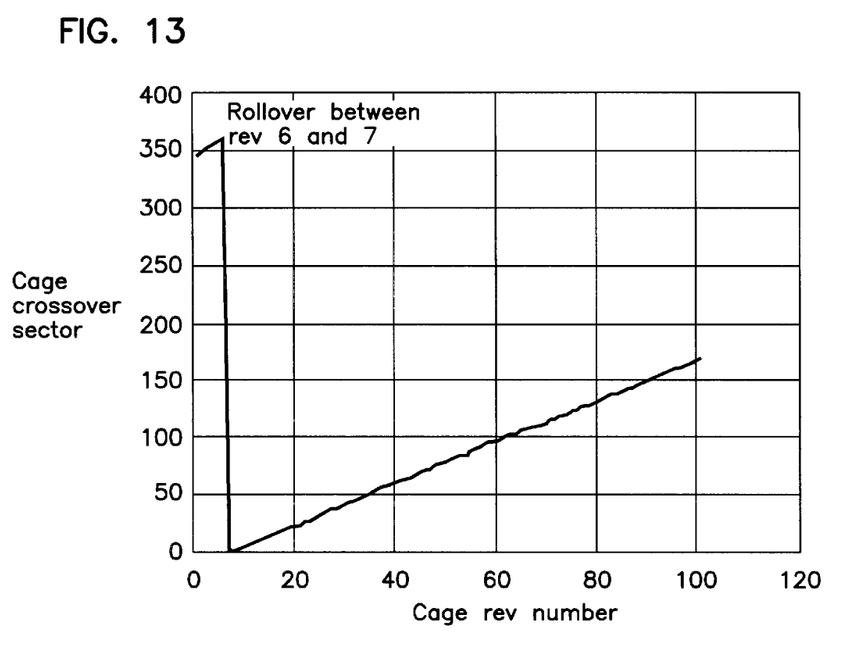

As will be explained herein, the present invention employs identifying the cage frequency profile for a few tracks of the disc drive, and predicts or interpolates the profile for the remaining tracks. However, a phase difference may develop between the predicted or interpolated cage frequency and the actual written-in cage frequency. FIG. 13 shows the crossover sector shift with the number of cage revolutions due to frequency error. If there is no error in either the identified magnitude or starting phase of the cage frequency, the identified cycle of the cage frequency is $N_{c0}$ sectors and the cycle of the actual cage frequency is $N_c$ sectors. The phase shift, in terms of sectors, is $l = (N_{c0} - N_c) \cdot m$, where m is the number of cage frequency cycles, in terms of sectors, over which the phase shift occurs. The predicted cage frequency error, that is the error between the actual and predicted cage frequency due to phase shift, is $$E(n_c) = P_c(n_c) - P_{ci}(n_c) \approx$$

$$\frac{\sin(2\pi f_c T_s \cdot l)}{\sin\left(\pi F_{c0} T_s \cdot \left(\frac{1}{2} N_{c0} - l\right)\right)} \cdot P_c \cdot \sin\left(2\pi f_{c0} T_s \cdot \left(n_c - \frac{1}{2}\left(\frac{1}{2} N_{c0} - l\right)\right)\right)$$

where cage sector $n_c \in [0, N_{c0}-1]$. When the phase drift $l$ is zero, the error $E(n_c)$ is also zero. However, when the phase drift $$l = \frac{N_c}{2},$$

the error $E(n_c) = 2 \cdot P_c \sin(2\pi f_{c0} T_s \cdot n_c)$, and the track closure and track squeeze caused by cage frequency are doubled. Consequently, it is important to cancel phase drift between the actual cage frequency and the predicted cage frequency.

In accordance with the present invention, the tracks of the disc are segregated into zones, and the written-in cage profile is identified for each zone. The zones are small enough that frequency drift over the zone does not affect phase shift beyond a design limit. Preferably, zones containing about 400 radial tracks provides a manageable maximum phase shift over the zone.

The magnitude of the cage frequency signal in zone i is $$P_{ci}(n) = P_{ci} \cdot \sin\left(\frac{2\pi \cdot (n + n_{ci})}{N_{ci}}\right), \quad \text{Eq. 4}$$

where $P_{ci}$ is the identified peak cage frequency signal, $n \in [0, N_W \cdot M_k - 1]$, $M_k$ is the number of radial bursts in zone i, and $N_{ci}$ is the number of servo sectors in a cage frequency cycle in zone i. As shown in FIG. 2, the number of radial bursts $M_k$ in a zone is twice the number of tracks in that zone, and hence is a measure of disc frequency cycles in terms of sectors. The number of cage frequency cycles $$N_{ci} = N_{ci-1} + \frac{L_i}{M_{ci}},$$

where $N_{ci-1}$ is the number of servo sectors in a cage frequency cycle in the prior zone i-1, $M_{ci}$ is an integer number of cage frequency cycles in zone i and $L_i$ is the difference between the identified starting phase and predicted starting phase in zone i. The sector number where burst closure occurs is calculated as $$n_s(m) = \text{remainder}\left(\frac{N_W \cdot m + n_{s0}}{N_k}\right), \quad \text{Eq. 5}$$

where $n_{s0}$ is the sector number where the burst closure occurs in m=0. The written-in cage frequency profile for each burst is described by Equations 4 and 5.

In the present invention, it is preferred that information concerning cage frequency, maximum burst closure and initial phase be calculated and stored for tracks at various radial positions on the disc. Conveniently, this can be accomplished simply by employing one or few tracks from each zone of the zone bit recording. Alternatively, the selected tracks may be distributed across the radius of the track in any fashion deemed desirable. In either case, the actual frequency, maximum burst closure and phase are interpolated from the values associated with the zone during normal read and write operations of the disc drive.

Figure 14:
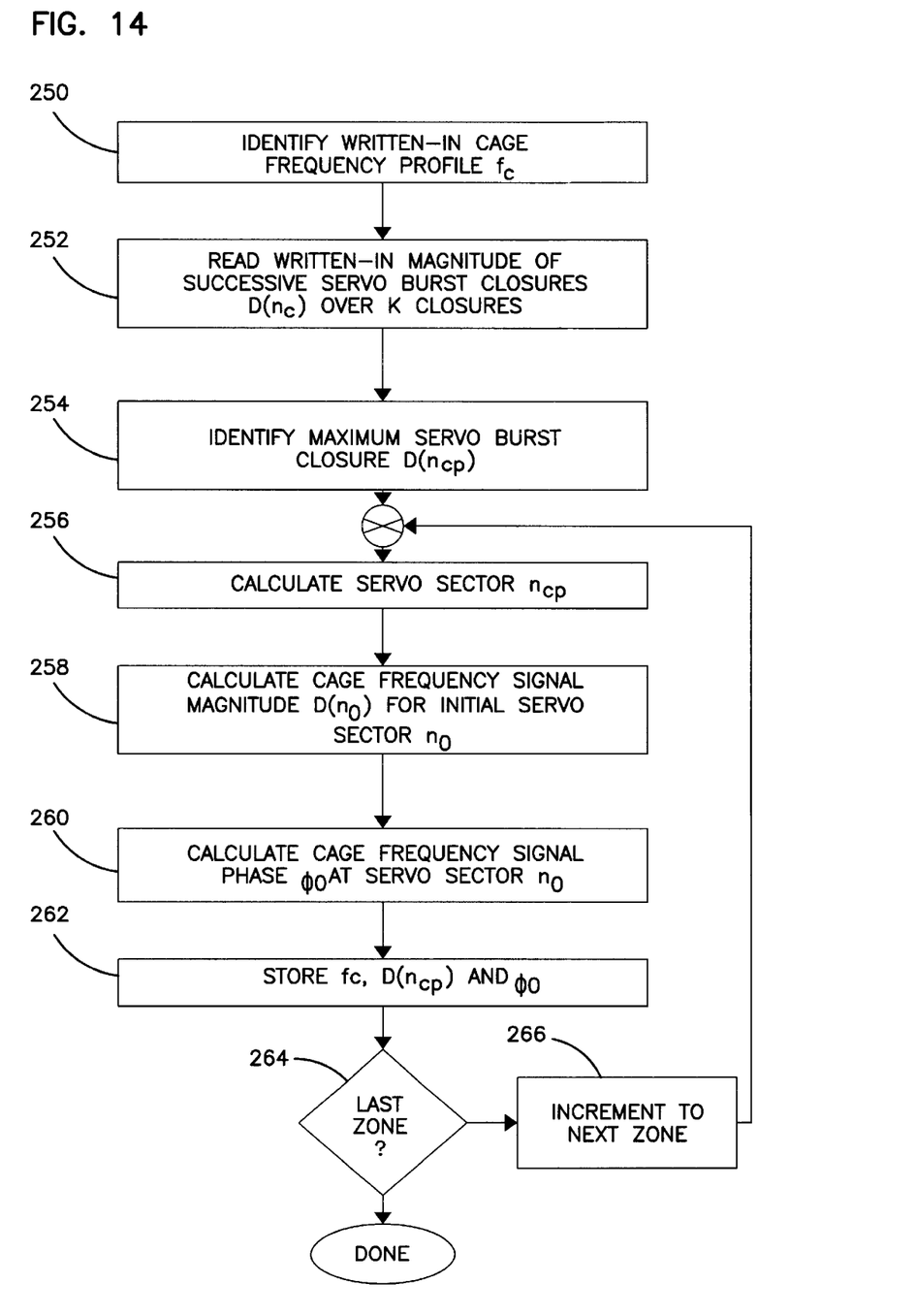
FIG. 14 is a flow chart illustrating the process of identifying and storing a cage frequency profile in accordance with the present invention.

FIG. 14 is a flow chart illustrating the process of identifying the cage frequency profile in accordance with the present invention. At step 250, the initial written-in cage frequency profile $f_c$ is identified as heretofore described. At step 252, the magnitudes of written-in servo burst closure $D(n_c)$ is read for a plurality of K consecutive burst closures extending over a plurality of adjacent tracks. As described in connection with FIG. 7, the value of K is large enough to obtain an adequate sample so that one of the burst closures is likely to be at or near a maximum burst closure. At step 254, the maximum servo burst closure $D(n_{cp})$ is identified as the largest burst closure found. At step 256, the identification of servo sector $n_{cp}$ where the maximum servo burst closure occurs is calculated from Equation 2. At step 258, the magnitude $D(n_0)$ of the cage frequency signal at a selected initial servo sector $n_0$ is calculated based on a difference between servo sector $n_0$ and a servo sector $n_{cp}$ and the maximum servo burst magnitude $D(n_{cp})$. At step 260, the initial phase $\phi_0$ of the cage frequency is calculated for servo sector $n_0$ using Equation 1. The maximum magnitude $D(n_{cp})$, the initial phase $\phi_0$ and the cage frequency $f_c$ are stored to a table at step 262.

At step 264, a determination is made as to whether the current zone is the last zone for which calculation is required. If it is, the process ends. If it is not, the process loops back to increment zone number at step 266 and perform steps 256–262 for the next zone.

The zones are preferably small enough that phase drift over the zone does not materially affect the detection of cage frequency and writing cage frequency profiles (frequency, maximum servo burst closure and phase) over the zone.

B. Compensating for Cage Frequency Profile

The identification of cage frequency is performed during certification test of the disc drive. Cage frequency compensation is carried out using either a ZAP correction technique or a look-up table technique. The ZAP correction technique adds a correction value to the ZAP data in a ZAP table for injection into the control system as a feed forward compensation input. The look-up table technique places the cage frequency parameters in a look-up table for lookup to compensate the head position signal with a feed forward compensation input.

For the ZAP correction technique, during certification or qualification of the disc drive, the cage frequency is identified before performing ZAP learning on the repeatable runout. The magnitude, frequency and starting phase parameters of the cage frequency are saved in memory for each zone. During ZAP learning, as described in the aforementioned application Ser. No. 09/489,532, the learned ZAP data is modified by the cage frequency profile generated by Equations 4 and 5 for storage in the ZAP table.

Figure 15:
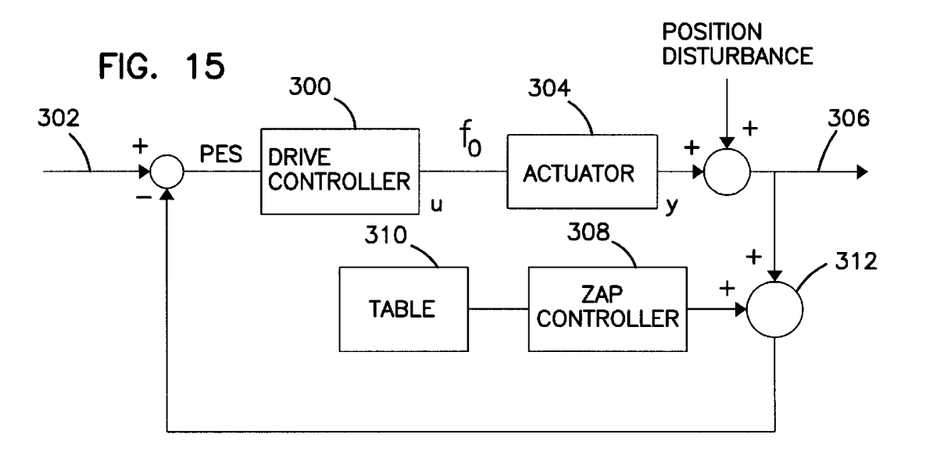
FIG. 15 is a block diagram of a feed forward compensation technique for minimizing the effects of cage frequency error according to a preferred embodiment of the present invention.

FIG. 15 is a block diagram of a track following controller model employing the ZAP correction in accordance with the presently preferred embodiment of the present invention. The controller model includes a drive controller 300 that receives position signals from input 302 and provides an output to actuator 304, which may be a voice coil motor 116 (FIG. 1). Actuator 304 responds to signals from controller 300 to change the position of a data head, such as head 111 (FIG. 1). For example, controller 300 may provide track seek signals to move the head from one track to another, or may provide track following signals to maintain the head over the center of a track. A position disturbance, such as windage, vibration, runout (including non-repeatable runout due to cage frequency) and other factors, may cause changes of the head/track position so that the head appears to move slightly from track center. The position disturbance is reflected in a position error signal at 306 which is combined with a ZAP correction by summing device 312. The ZAP correction value is stored in a ZAP table 310 and accessed by ZAP controller 308 for summing by summing device 312 with the position error signal. The combined position error and ZAP correction signal is fed forwarded to drive controller 300 to adjust the position of the head.

ZAP table 310 contains ZAP data representing repeatable runout profiles modified by the non-repeatable cage frequency profile. The ZAP table is stored in the track identification sector on the disc track during qualification or certification of the disc drive. During normal read and write operations, the ZAP table is read back from the track identification by ZAP controller 308 to derive a compensation factor to the position error signal based on the RRO-ZAP data and the written-in NRRO-cage frequency profile. The compensated position error signal is injected into the control system as a feed forward compensation input.

If the compensation is performed using a look-up table, the cage frequency is identified during certification or qualification of the disc drive and stored in a RAM (random access memory). Each zone of the disc has an entry in a look-up table that identifies the magnitude, frequency and starting phase data for the cage frequency. The look-up table is stored in reserved tracks on disc 107 (FIG. 1) of the disc drive for retrieval during read and write operations. During normal read and write operations, the magnitude, frequency and starting phase parameters are retrieved from the reserved tracks to the RAM, and the cage frequency profile for the track of interest is generated by interpolation using Equations 4 and 5. Data reflecting the profile is injected into the position error signal as a feed forward compensation input to cancel effects of cage frequency in the signal to controller 300. The advantage of this solution allows more accurate correction of cage frequency profile during read and write operations, but the drawback is memory consumption and on-the-fly calculation. For a disc drive with 20,000 tracks, if 400 tracks exist per zone, the table will contain 50 entries, each requiring a start phase, frequency offset from a default frequency (e.g., 36 Hertz) and magnitude data. Therefore, a RAM memory of about two kilobytes is required to store the look-up table.

Stated another way, in a preferred embodiment, the magnitude and frequency of written-in runout due to vibration of the cage of a spindle motor of a disc drive 100 is identified for use by the disc drive to compensate the position of head 111 due to the written-in runout during operation. The process of identifying written-in runout includes identifying an initial cage frequency value of the motor. The written-in magnitude of servo burst closures is read at step 252 over a plurality of tracks, and a maximum servo burst closure is identified at step 254 from the plurality of read servo bursts. The magnitude of the cage frequency at a servo sector $n_0$ is calculated at steps 256 and 258 based on a difference between the read magnitudes of the servo burst closures at servo sectors $n_c$ and $n_{c+1}$. The initial phase of the cage frequency is calculated at step 260 based on the magnitude of the written-in cage frequency at servo sector $n_0$. The cage frequency profile, in the form of the cage frequency, maximum servo burst closure and calculated phase, is stored at step 262 in memory 310. Preferably, the cage frequency profile is calculated for each of a plurality of zones on the medium, thereby minimizing phase shift.

The track following signal in disc drive 100 is compensated for written-in cage frequency runout. A position signal is supplied to an actuator 304 of the disc drive, and is modified based on a cage frequency profile of the disc drive. Preferably, learned ZAP data is modified by the cage frequency profile and stored in a ZAP memory 310. A compensation signal based on the modified ZAP data is added to a signal representing a position disturbance of a read head of the disc drive. The result is applied to the drive controller 300 to operate actuator 304.

Controller 300 provides a position signal to the actuator 304 to control position of the head relative to a selected track 113 on the medium 107, and cage frequency profile means modifies the position signal based on a cage frequency profile of the disc drive. The cage frequency profile means includes a memory 310 containing the cage frequency profile associated with the disc drive. A summing device 312, such as a feed forward controller, combines the cage frequency profile with a signal representing a position disturbance of the head and a position command signal. The drive controller 300 is responsive to the summing device 312 to operate the actuator 304 to control the position of the head 111 relative to the selected track 113.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements for detecting cage frequency may vary depending on the particular application. Additionally, the particular elements of the storage and correction of cage frequency runout may vary depending on the particular disc drive, while maintaining substantially the same functionality without departing from the scope and spirit of the present invention. Thus, although the preferred embodiment described herein is directed to using a ZAP system for correcting for runout due to cage frequency, the cage frequency data may be stored on the disc, or in a separate ROM accessible to the drive electronics. Additionally, while compensation for cage frequency runout is described in connection with a feed forward compensation, which injects compensation before the actuator controller, any compensation strategy may be employed, including a feedback compensation that injects compensation into the signal from the controller to actuator 116. It will be appreciated by those skilled in the art that the teachings of the present invention can be applied to other systems, such as dedicated servo systems, without departing from the scope and spirit of the present invention. Moreover, while a specific example is set forth in the specification, the teachings of the present invention can be applied to other disc drives, including optical disc drives employing other configurations of servo patterns and servo sectors, without departing from the scope and spirit of the present invention.

What is claimed is:

1. A process of identifying written-in runout due to vibration of the cage of a motor that moves a device having sectors comprising steps of:
   a) calculating a magnitude of the cage frequency at an initial sector; and
   b) calculating a phase of the cage frequency based on the magnitude of the written-in cage frequency at the initial sector.

2. The process of claim 1 wherein the device is a rotatable medium having a plurality of substantially concentric storage tracks, each track having a plurality of servo sectors, at least some tracks exhibiting a servo burst closure between successive servo sectors due to the written-in runout, the process further comprising:

c) reading a written-in magnitude of servo burst closures over a plurality of tracks, and wherein the cage frequency magnitude is calculated based on a difference between the read magnitudes of the servo burst closures.

3. The process of claim 2, wherein step (c) is performed over successive servo burst closures over the plurality of tracks.

4. The process of claim 2, further comprising:

d) identifying a maximum servo burst closure from the plurality of read servo bursts, and e) storing values of the cage frequency, maximum servo burst closure and calculated phase.

5. The process of claim 2, further comprising d) identifying a maximum servo burst closure from the plurality of read servo bursts, and wherein the calculation of the cage frequency magnitude at the initial sector comprises:

calculating a servo sector having the maximum servo burst closure, and calculating a cage frequency magnitude based on the maximum servo burst closure and a number of servo sectors between the initial servo sector and the servo sector having the maximum servo burst closure.

6. The process of claim 5, further comprising:

e) storing values of the cage frequency, maximum servo burst closure and calculated phase.

7. The process of claim 2, further comprising:

d) identifying a maximum servo burst closure from the plurality of read servo bursts, e) segregating the tracks into a plurality of zones, and f) repeating steps (a) through (d) for each zone.

8. The process of claim 7, further comprising:

g) storing values of the cage frequency, maximum servo burst closure and calculated phase for each zone.

9. The process of claim 7, wherein the calculation of the cage frequency magnitude at the initial sector comprises:

calculating a servo sector having the maximum servo burst closure, and calculating a cage frequency magnitude at the initial servo sector based on the maximum servo burst closure and a number of servo sectors between the initial servo sector and the servo sector having the maximum servo burst closure.

10. The process of claim 9, further comprising:

g) storing values of the cage frequency, maximum servo burst closure and calculated phase for each zone.

11. A process of controlling a movable arm comprising:

providing a signal to control the movable arm, the signal being based at least in part on a transduced position signal and a cage frequency profile of written-in cage frequency runout.

12. The process of claim 11, further comprising:

reading the cage frequency profile from a memory, combining the cage frequency profile, a signal representing a position disturbance of the arm, and a position command signal, and applying the combined signal to move the arm.

13. The process of claim 12, wherein the cage frequency profile is part of a zero acceleration path feed forward to an arm controller.

14. The process of claim 11, further comprising:

modifying the position signal based on repeatable written-in runout, identifying cage frequency parameters, generating the cage frequency profile based on the cage frequency parameters, learning correction parameters for the repeatable runout with a zero acceleration path, modifying the learned correction parameters with the cage frequency profile, and storing the modified correction parameters.

15. The process of claim 14, wherein the arm is positionable relative to tracks on a medium, wherein each track has a plurality of servo sectors, and the generation of the cage frequency profile comprises:

calculating a cage frequency correction signal based on $$P_{ci}(n) = P_{ci} \cdot \sin\left(\frac{2\pi \cdot (n + n_{ci})}{N_{ci}}\right), \text{ and}$$

$$n_s(m) = \text{remainder}\left(\frac{N_W \cdot m + n_{s0}}{N_k}\right),$$

where $P_{ci}$ (n) is the magnitude of the cage frequency signal at a servo sector, $n_s(m)$ is the servo sector where a servo burst closure occurs, $P_{ci}$ is the peak magnitude of the cage frequency signal, $n+n_{ci}$ is the burst write time in terms of number of servo sectors of the cage frequency cycle, $N_{ci}$ is the number of servo sectors in a cycle of cage frequency signal, $N_w$ is the burst write time in terms of number of servo sectors of a track, m is the number of cage frequency cycles to the track, $n_{s0}$ is the sector of burst closure in cycle m=0, and $N_k$ is the number of servo sectors on the track.

16. The process of claim 14, further comprising:

applying the stored correction parameters to the position signal during movement of the arm.

17. Apparatus for compensating a radial position of a device for written-in cage frequency runout, the device being coupled to an actuator for radial positioning relative to a rotatable medium, the apparatus comprising:

a controller providing a signal to the actuator to position the device relative to the medium, the signal being based at least in part on a position signal representing a position of the device; and cage frequency profile means for modifying the signal based on a cage frequency profile of the written-in cage frequency runout, which is associated with the device.

18. The apparatus of claim 17, wherein the cage frequency profile means includes:

a memory storing data representing cage frequency parameters, and a processor responsive to the cage frequency parameters for modifying a signal representing a position disturbance of the device, the controller being responsive to the processor to operate the actuator to control the position of the device.

19. The apparatus of claim 18, wherein the data stored in the memory represents written-in repeatable runout modified by written-in non-repeatable runout due to cage frequency.

20. The apparatus of claim 18, wherein data stored in the processor is responsive to the data stored in the memory to interpolate a cage frequency correction signal, the processor further including
 a summing device for summing the cage frequency correction signal with the signal representing position disturbance of the device.

21. The apparatus of claim 20, wherein the medium has a plurality of tracks each having a plurality of servo sectors, and the processor is so disposed and arranged to calculate the cage frequency correction signal based on $$P_{ci}(n) = P_{ci} \cdot \sin\left(\frac{2\pi \cdot (n + n_{ci})}{N_{ci}}\right), \text{ and}$$

$$n_s(m) = \text{remainder}\left(\frac{N_W \cdot m + n_{s0}}{N_k}\right),$$

where $P_{ci}(n)$ is the magnitude of the cage frequency signal at a servo sector, $n_s(m)$ is the servo sector where a servo burst closure occurs, $P_{ci}$ is the peak magnitude of the cage frequency signal, $n+n_{ci}$ is the burst write time in terms of number of servo sectors of the cage frequency cycle, $N_{ci}$ is the number of servo sectors in a cycle of cage frequency signal, $N_w$ is the burst write time in terms of number of servo sectors of the track, m is the number of cage frequency cycles to the track, $n_{s0}$ is the sector of burst closure in cycle m=0, and Nk is the number of servo sectors on the track.

22. The apparatus of claim 17, wherein the cage frequency profile means includes a zero acceleration path feed forward to the controller.

* * * * *

UNITED STATES PATENT AND TRADEMARK OFFICE
CERTIFICATE OF CORRECTION

PATENT NO. : 6,785,073 B2
DATED : August 31, 2004
INVENTOR(S) : Min et al.

It is certified that error appears in the above-identified patent and that said Letters Patent is hereby corrected as shown below:

Title page,
Item [75], Inventors, change "KianKeon Ooi, Singapore (SG);" to
-- KianKeong Ooi, Singapore (SG); --.

Signed and Sealed this

Twenty-second Day of March, 2005

JON W. DUDAS
*Director of the United States Patent and Trademark Office*